(12) United States Patent
Durica et al.

(10) Patent No.: US 8,201,019 B2
(45) Date of Patent: Jun. 12, 2012

(54) DATA STORAGE DEVICE IN-SITU SELF TEST, REPAIR, AND RECOVERY

(75) Inventors: William John Durica, Morgan Hill, CA (US); M. Amine Hajji, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 12/431,233

(22) Filed: Apr. 28, 2009

(65) Prior Publication Data

US 2010/0275057 A1    Oct. 28, 2010

(51) Int. Cl.
G06F 11/00 (2006.01)
(52) U.S. Cl. .................. 714/6.22; 714/6.32
(58) Field of Classification Search .......... None
See application file for complete search history.

(56) References Cited

U.S. PATENT DOCUMENTS

| | | | |
|---|---|---|---|
| 6,208,477 B1 | 3/2001 | Cloke et al. | |
| 6,292,912 B1 | 9/2001 | Cloke et al. | |
| 6,308,007 B1 | 10/2001 | Iwasaki | |
| 6,393,580 B1 | 5/2002 | Harada | |
| 6,467,054 B1 | 10/2002 | Lenny | |
| 6,772,313 B2 | 8/2004 | Oh | |
| 7,032,127 B1 | 4/2006 | Egan et al. | |
| 7,143,308 B2* | 11/2006 | Tseng et al. ............ | 714/6 |
| 7,275,132 B2 | 9/2007 | Cunchon et al. | |
| 7,302,608 B1* | 11/2007 | Acharya et al. ........ | 714/13 |
| 7,308,600 B2* | 12/2007 | Dubal et al. .......... | 714/6 |
| 7,389,379 B1* | 6/2008 | Goel et al. .......... | 711/112 |
| 7,464,290 B2* | 12/2008 | Chien ............... | 714/7 |
| 7,533,292 B2* | 5/2009 | Van Gundy et al. ...... | 714/7 |
| 7,685,463 B1* | 3/2010 | Linnell ............. | 714/7 |
| 7,827,434 B2* | 11/2010 | D'Souza et al. ....... | 714/3 |
| 2006/0015771 A1* | 1/2006 | Van Gundy et al. ...... | 714/7 |
| 2008/0104387 A1 | 5/2008 | Owhadi et al. | |
| 2008/0263393 A1* | 10/2008 | Shirogane et al. ...... | 714/7 |
| 2009/0125754 A1* | 5/2009 | Chandra et al. ....... | 714/7 |
| 2009/0259882 A1* | 10/2009 | Shellhamer .......... | 714/7 |

FOREIGN PATENT DOCUMENTS

| | | |
|---|---|---|
| CN | 1504893 A | 6/2004 |
| CN | 101051283 A | 10/2007 |
| JP | 2004130539 A | 4/2004 |

* cited by examiner

*Primary Examiner* — Christopher McCarthy
(74) *Attorney, Agent, or Firm* — Yee & Associates, P.C.; Steven L. Bennett

(57) ABSTRACT

A method, apparatus, and computer program product for performing a set of operations on a data storage device is provided. A data storage device is flagged as suspect. The adapter suspends the suspect data storage device from participation in the RAID array, assigns the suspect data storage device to a pool of data storage devices to be retested, selects a data storage device from a pool of spare data storage devices, rebuilds contents of the suspect data storage device on the selected disk drive, assigns the substitute data storage device to the RAID array, invokes a diagnostic test on the suspect data storage device, and analyzes the diagnostic result. Responsive to the diagnostic result exceeding a threshold, the suspect data storage device is repaired. The adapter assigns the repaired data storage device to the pool of spare data storage devices and increments a counter of the repaired data storage device.

11 Claims, 5 Drawing Sheets

DATA STORAGE DEVICE IN-SITU SELF TEST, REPAIR, AND RECOVERY

BACKGROUND OF THE INVENTION

1. Field of the Invention

The present invention relates generally to memory and more specifically to a method, apparatus, and computer program product for performing a set of operations on a data storage device such as a hard disk drive, a solid state device or any other type of storage device.

2. Description of the Related Art

Currently, in Redundant Array of Independent Disk (RAID) arrays, when a hard disk drive (HDD) or any other type of data storage device fails or encounters an error, the only recover action possible is to reset the drive to a prior state. If the reset fails or the drive is reset too many times, the drive is rejected by the RAID array, removed from the RAID array, and sent for failure analysis testing. The rejected drive requires the RAID array to be rebuilt from a spare drive, which costs time and money to the customer. Currently, as many as half of disk drives rejected as faulty are found not to have a fault, or "no trouble found" during failure analysis. Currently, no solution exists to detect these no trouble found drives before they are returned to the manufacturer or third party as rejected parts.

BRIEF SUMMARY OF THE INVENTION

According to one embodiment of the present invention, a data storage device is flagged as a suspect data storage device, wherein the flagging indicates a rejection due to an error. An adapter suspends the suspect data storage device from participation in the RAID array, assigns the suspect data storage device to a pool of data storage devices to be retested, and selects a data storage device from a pool of spare data storage devices, forming a selected data storage device. The adapter rebuilds contents of the suspect data storage device on the selected disk drive, forming a substitute data storage device. The adapter assigns the substitute data storage device to the RAID array, invokes a diagnostic test on the suspect data storage device to produce a diagnostic result, wherein the diagnostic test runs in a background of the RAID array, and analyzes the diagnostic result. Responsive to the diagnostic result exceeding a threshold, the suspect data storage device is repaired, forming a repaired data storage device. The adapter assigns the repaired data storage device to the pool of spare data storage devices and increments a counter of the repaired data storage device, wherein the counter indicates a number of times the repaired data storage device has been repaired.

DETAILED DESCRIPTION OF THE INVENTION

Figure 1:
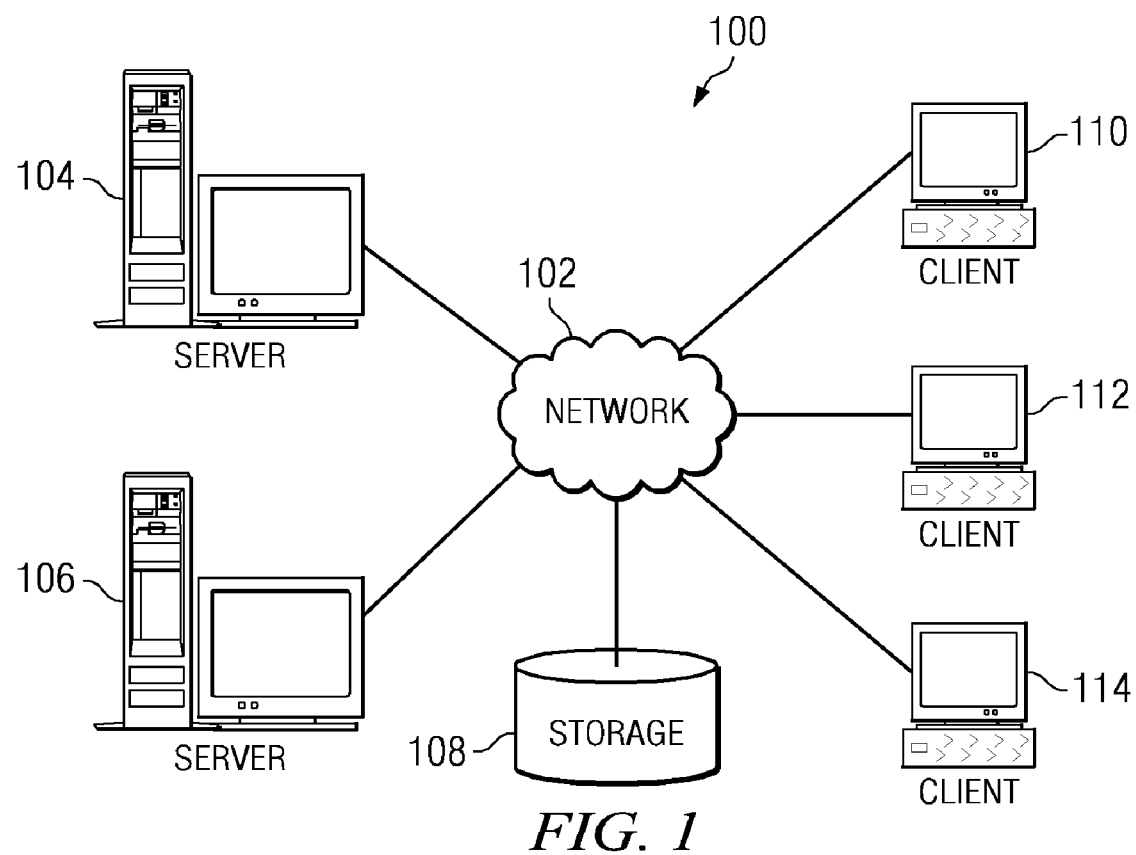
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
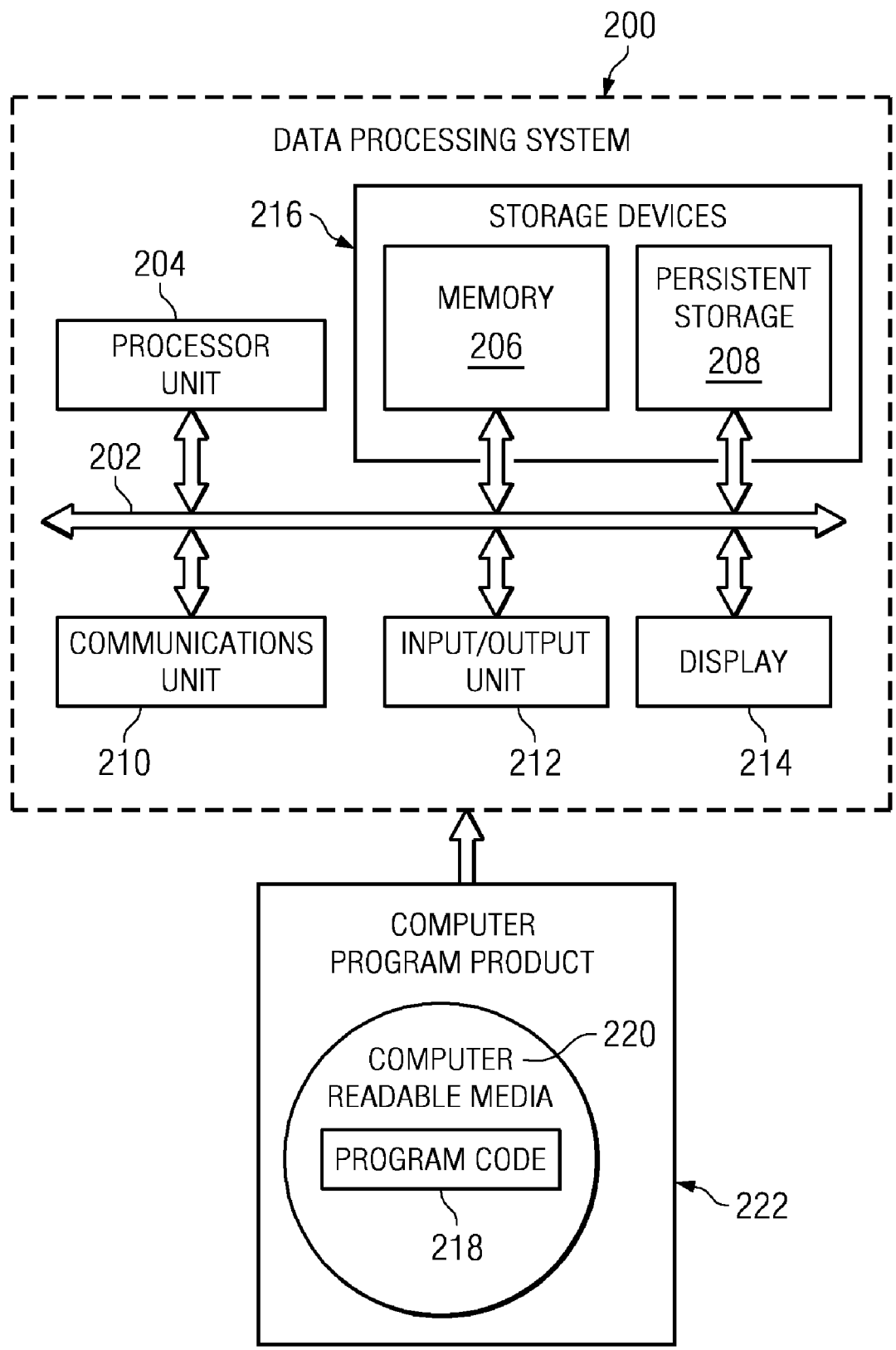
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Exemplary embodiments provide for an in-situ self test of a data storage device, such as a hard disk drive or solid state device, in a RAID array. Exemplary embodiments provide for reducing the number of customer engineer repair actions in the field for data storage devices that otherwise would later be found to have no defects and/or data storage devices that have correctable defects that, after a successful self initiated repair, can be reintroduced either as hot spares or back on line by the storage system controller/initiator as needed. Currently, there are no known solutions for this problem, which creates considerable service costs as a consequence of not having a solution.

There are currently only a few basic recovery functions that can be performed on a data storage device in a RAID array while the drive is on line. These recovery functions include: (i) an adapter, such as a device adapter or storage device adapter, which issues a command to reset the data storage device or to reset the bus/loop on which the data storage device resides if the adapter detects problems communicating to one or more data storage devices, (ii) the data storage device will perform a self initiated reset under certain conditions if the data storage device is unable to recover in order to return the data storage device to a known state; and (iii) when I/O errors occur, data storage devices perform data error recovery within a predetermined system response time.

Data storage devices that experience any of the aforementioned three (3) situations may be rejected by the device adapter or host controller if the data storage devices are not able to successfully recover after a predetermined number of error recovery events or steps or logged events or if the data storage device times out or has logged too many time delays within a given time period. No attempt is made to recover the drives afterwards and the device is rejected.

One drawback to the presently existing recovery functions is that rejected data storage devices do not perform a comprehensive self-test that is equivalent in scope to what is done when the data storage device was first built. Therefore, data storage devices that may have lost electrical contact, or experienced excess vibrations due to poor mechanical seating, or experienced one-time events, such as a temporary electrical disturbance, cannot be functionally checked in-situ and the only recourse is to replace the data storage device.

Additionally, data storage devices that experience a one time unrecoverable media defect event that impacts several tracks becomes a reject candidate for too many hard errors. An example of a hard error is being unable to read customer data. Soft errors are detected by the storage device and recovered using error recovery algorithms, whereas hard errors are unrecovered by the storage device and require external recovery like RAID parity or backup storage. Without the use of repeated self tests over a set time to ensure that the problem was resolved and no further degradation is likely, there is no recourse at this time but to replace the drive.

Exemplary embodiments provide that as long as power is available to a data storage device, the data storage device will have a timer, hereinafter referred to as a "supra watchdog timer," that will invoke a set of actions at the highest level interrupt priority upon reaching a predetermined time limit. Additionally, a system adapter/initiator will, in turn, be able to check the status of the data storage device to see if the data storage device can be brought back online. In the case of RAID configurations the initiator will determine if the data storage device can either resume its place in the RAID array, assist/reduce time for rebuild by serving as a copy source for a hot spare, or be included in a pool of spare data storage devices, referred to as a "hot spare pool." The supra watchdog timer is reset each time the data storage device receives and acknowledges input from the initiator(s).

According to an exemplary embodiment, the set of actions that the adapter/initiator in conjunction with the data storage device can perform include: (i) logging the supra watchdog timeout event(s); (ii) initiating a comprehensive data storage device self test similar to that required by the manufacturer at time building the data storage device; and (iii) perform corrective actions as needed. Optionally, the adapter/initiator in conjunction with the data storage device can be configured to validate corrective actions and log the corrective actions, which includes an algorithm to repeatedly check for grown defects over a period of time and to report new status, via various means, the statuses including ready with no known problems, ready with fixed problems, and drive not ready. Grown defects are typically media defects, defective sectors, that is, defects that cause data to be unable to be read, that are the result of further degradation of the storage media in the vicinity of the first detected defect.

According to an exemplary embodiment, the actions that the adapter/initiator perform include (i) checking, periodically, the status of the idle data storage devices, meaning the spare and rejected data storage devices; (ii) keeping track of the Vital Product Data (VPD), such as type, capacity, identifier, of rejected data storage devices and timestamp of when the data storage device was rejected; and (iii) determining, via an algorithm, when and if to bring back the rejected data storage device in order to copy contents onto a rebuilt data storage device or to resume role of an array member or to include the data storage device in the hot spare pool, or to permanently reject the data storage device if the data storage device has exceeded a threshold number of times the data storage device was rejected. Checking the status of the idle drives may be accomplished by sending commands to the data storage device that invokes a self test of the data storage device and/or other equivalent customized testing procedures.

The self test of the data storage device is performed in situ, while the data storage device is online. The test is run in the background for a number of hours. The background, or background task, is a low priority, preemptive task that does not impact performance of the RAID array. The adapter/initiator reviews the results of the test. If the data storage device passes the test, the data storage device is marked as good, any needed repairs are performed, and the data storage device is added to the hot spare pool. An entry is made indicating that the data storage device has been repaired. Additionally, the cause of the error, if it can be determined, is logged. A set of rules are checked, and responsive to the number of times the data storage device has been repaired exceeding a threshold value, the data storage device is rejected. Also, if the data storage device fails to pass the test, the data storage device is rejected. The customized self test actually generates the error codes that are interpreted by the adapter/initiator to determine whether the data storage device passes or fails the test. Performing the test in situ, or in the actual operating environment of the data storage device, allows for more accurate error detection and determining the source of the error. Performing the test at a different location can make the environment difficult or impossible to reproduce, therefore, reproducing or determining the source of the error may be impossible. For example, by performing the test in situ, local error messages and other system messages can be analyzed that would not be present if the tests were performed at a remote location. Thus, by identifying the cause or source of the error, it can be determined whether the error is a one time error or some possibly reoccurring error, and corrective actions can be determined and initiated. For example, some operational parameters can be altered in order to prevent the error from occurring again.

Figure 3:
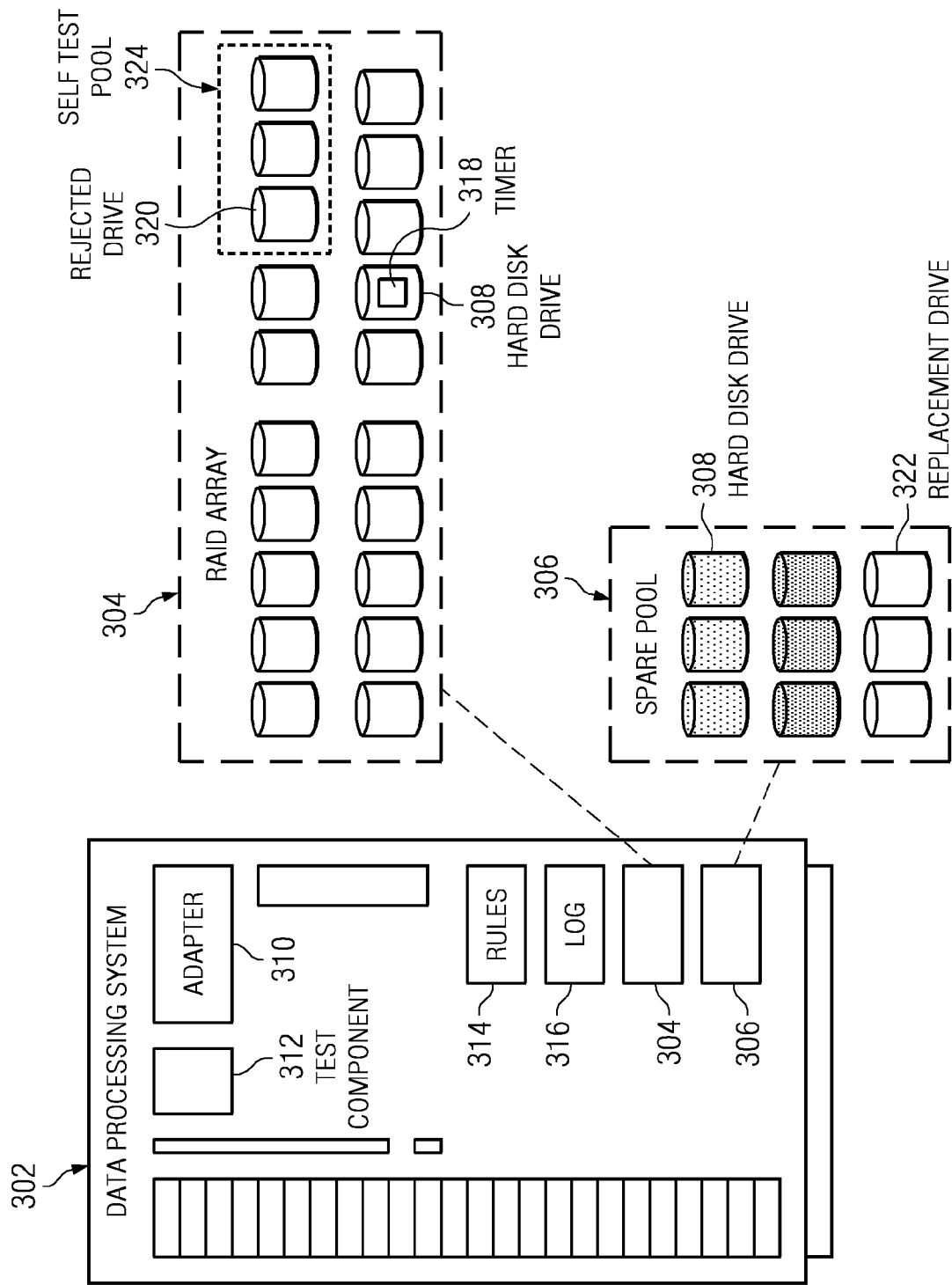
FIG. 3 is a block diagram of a system for performing a set of operations on a data storage device in accordance with an exemplary embodiment.

Turning back to the figures, FIG. 3 is a block diagram of a system for performing a set of operations on a data storage device, in accordance with an exemplary embodiment, generally designated as reference numeral 300. System 300 comprises data processing system 302, which may be implemented as data processing system 100 in FIG. 1 or data processing system 200 in FIG. 2. Data processing system 302 comprises operational RAID array 304, spare pool 306, adapter 310, test component 312, rules 314, log 316, and self-test pool 324. In an exemplary embodiment, adapter 310 is the adapter/initiator and is a host bus adapter. Spare pool 306 is a hot spare pool. A host bus adapter is a logic card with firmware that interfaces via a bus to the device. Operational RAID array 304, spare pool 306, and self-test pool 324 comprise a plurality of hard disk drives 308, which are an example of a data storage device. Hard disk drive 308 may be implemented as persistent storage 208 in FIG. 2. In an exemplary embodiment, operational RAID array 304, spare pool 306, and self-test pool 324 are logical partitions of a RAID array.

Each hard disk drive 308 comprises a timer 318. Timer 318 is a supra watchdog timer. Timer 318 times out if hard disk drive 308 does not receive and acknowledge an input from timer 318 within a predetermined amount of time. Timer 318 is reset in each hard disk drive 308 when timer 318 receives and acknowledges an input from adapter 310. Each time a timer 318 in a hard disk drive 308 times out, adapter 310 makes an entry indicating this event in log 316. In other words, timer 318 measures a response interval for an expected communication from adapter 310 to form a response interval and if this response interval exceeds some predetermined threshold, a timeout error is generated.

Test component 312 is shown as being separate from adapter 310 and hard disk drives 308, however, in another exemplary embodiment, test component 312 may be part of adapter 310 or hard disk drives 308. Adapter 310 supervises operational RAID array 304 and spare pool 306. When a hard disk drive 308 in RAID array 304 has an error or if timer 318 times out, adapter 310 rejects the hard disk drive, forming rejected drive 320. Adapter 310 removes the rejected drive 320 from operating as part of RAID array 304 and places rejected drive 320 in self-test pool 324 in order to test rejected drive 320. However, rejected drive 320 is still online with data processing system 302 and receiving power. Adapter 310 then causes rejected drive to be rebuilt using a hard disk drive 308 from spare pool 306, forming replacement drive 322. Adapter 310 then places replacement drive 322 in operation as part of RAID array 304.

Adapter 310 then invokes rejected drive 320 to perform test 312 in back ground mode. Adapter 310 reviews the results of test 312. If rejected drive 320 passes test 312, adapter 310 marks rejected drive 320 as good, rejected drive 320 is repaired, and adapter 310 places rejected drive 320 into spare pool 306. Predefined rejection criteria are defined for the hard disk drive, such as bad sector count, read or write retry error count, buffer overrun, buffer error, etc. If the results of test 312 for rejected drive 320 exceed the limits set forth in the predefined rejection criteria, the storage device is rejected by the adapter/initiator, such as adapter 310. The adapter/initiator reviews the test results collected by the storage device and either rejects the storage device or marks the storage good for return to the spare pool. The adapter/initiator rejects the storage device based on the predefined rejection criteria.

Adapter 310 also adds an entry into log 316 indicating that rejected drive 320 has been repaired. Adapter 320 then checks log 316 to determine how many times rejected drive 320 has been repaired. Adapter 310 then compares this number to a predetermined threshold value stored in rules 314. If the number of times rejected drive 320 has been repaired exceeds the predetermined threshold value in rules 314, rejected drive 320 is rejected and taken offline and removed from spare pool 306.

Also, if adapter 310 is able to determine the cause of the error or timeout of rejected drive 320 this is also entered into log 316. If authorized, adapter 310 uses the information about the cause of the error to initiate corrective action in the system, such as altering performance characteristics, masking out additional defective sectors on the device, disabling device background features/functions that may be contributing to the failure, etc.

Figure 4A:
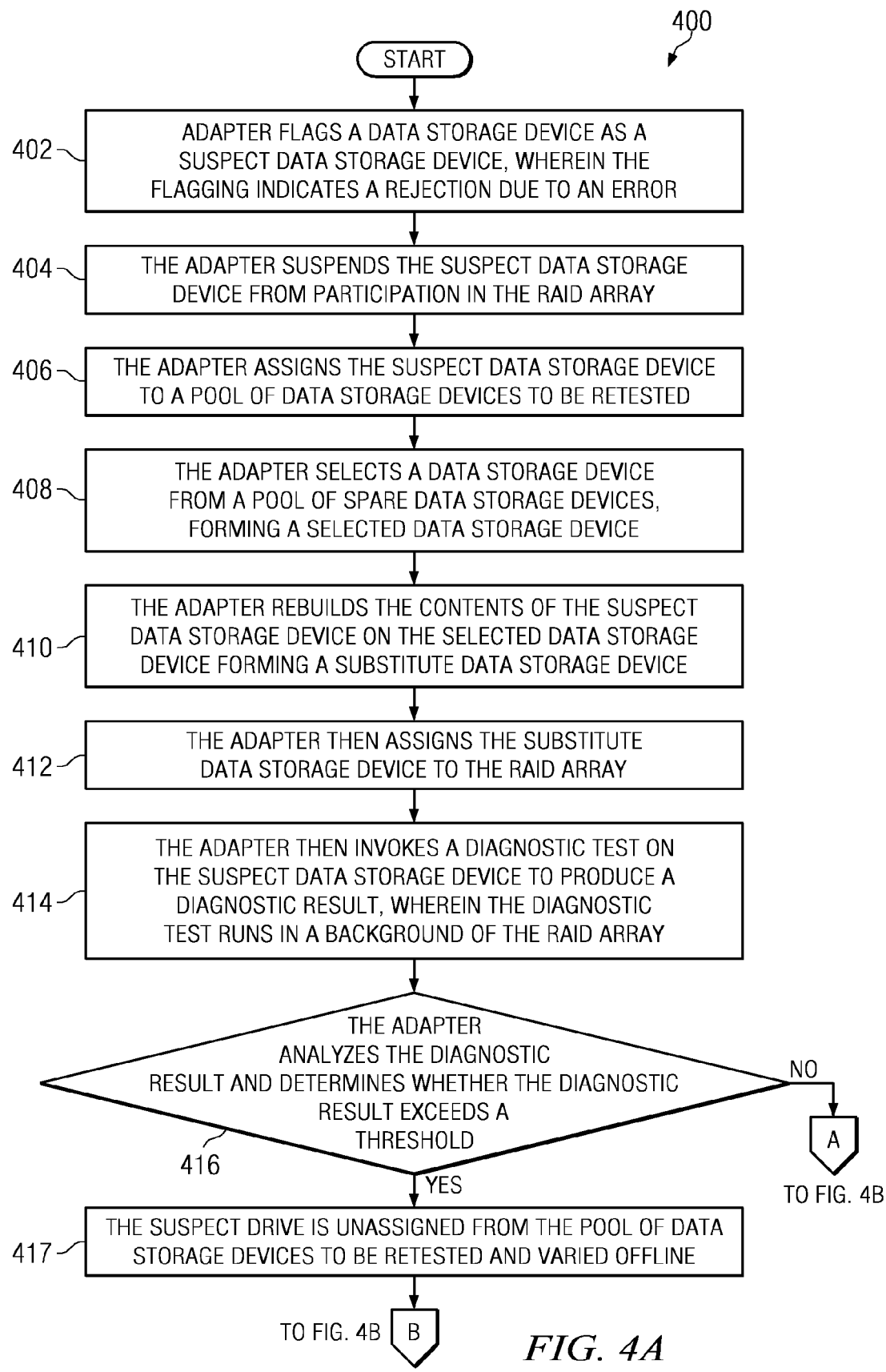
FIGS. 4A and 4B are a flowchart illustrating the operation of performing a set of operations on a data storage device, in accordance with an exemplary embodiment.
Figure 4B:
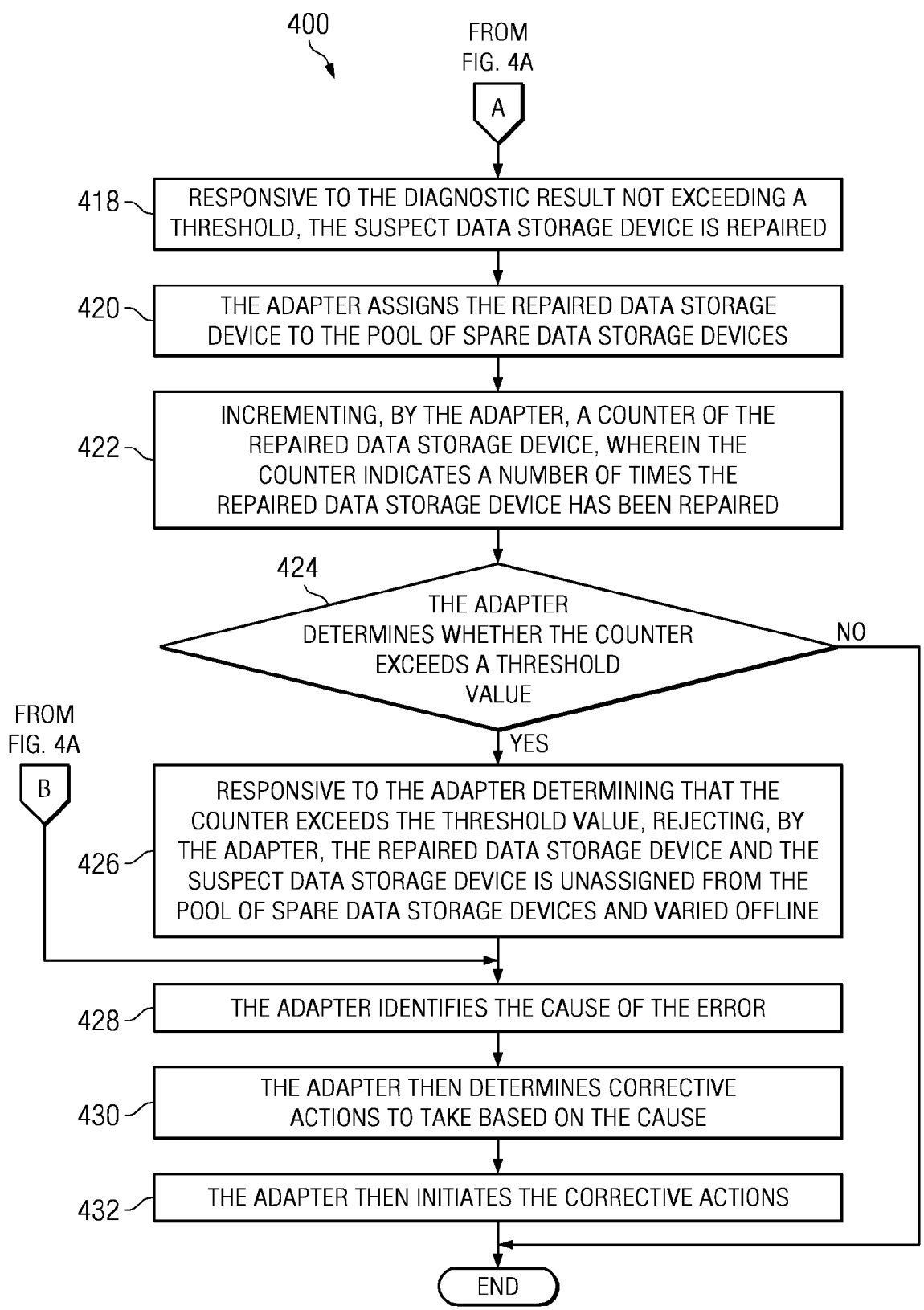

FIGS. 4A and 4B are a flowchart illustrating the operation of performing a set of operations on a data storage device in a RAID array, in accordance with an exemplary embodiment. FIG. 4 may be implemented in system 300 of FIG. 3. Process 400 is an example of a storage device maintenance process that may be implemented in adaptor 310 of FIG. 3. Process 400 begins when an adapter flags a data storage device as a suspect data storage device, wherein the flagging indicates a rejection due to an error (step 402). The adapter suspends the suspect data storage device from participation in the RAID array (step 404). The adapter assigns the suspect data storage device to a pool of data storage devices to be retested (step 406). The adapter selects a data storage device from a pool of spare data storage devices, forming a selected data storage device (step 408). The adapter rebuilds the contents of the suspect data storage device on the selected data storage device, forming a substitute data storage device (step 410). The adapter then assigns the substitute data storage device to the RAID array (step 412). The substitute data storage device is a functional replacement of the suspect data storage device.

The adapter then invokes a diagnostic test on the suspect drive to produce a diagnostic result, wherein the diagnostic test runs in a background of the RAID array (step 414). The adapter analyzes the diagnostic result and determines whether the diagnostic result exceeds a threshold (step 416). In an exemplary embodiment, the customized self test, or diagnostic test, generates the error codes that the adapter interprets to determine whether the data storage device passes the test. Predefined rejection criteria are defined for the hard disk drive, such as bad sector count, read or write retry error count, buffer overrun, buffer error, etc. If the diagnostic result exceeds the limits set forth in the predefined rejection criteria, the storage device is rejected by the adapter. Responsive to the diagnostic result exceeding a threshold (a yes output to step 416), the suspect drive is unassigned from the pool of data storage device to be retested and varied offline (step 417). Process 400 then proceeds to step 428.

Responsive to the diagnostic result not exceeding a threshold (a no output to step 416), the suspect drive is repaired (step 418). The adapter assigns the repaired data storage device to the pool of spare data storage devices (step 420). The adapter increments a counter of the repaired data storage device, wherein the counter indicates a number of times the repaired data storage device has been repaired (step 422).

The adapter determines whether the counter exceeds a threshold value (step 424). Responsive to the adapter determining that the counter does not exceed the threshold value (a no output to step 424), process 400 ends. Responsive to the adapter determining that the counter exceeds the threshold value (a yes output to step 424), the adapter rejects the repaired drive and the repaired drive is unassigned from the pool of spare drives and varied offline (step 426).

The adapter identifies the cause of the error (step 428). The adapter then determines corrective actions to take based on the cause (step 430). The adapter then initiates the corrective actions (step 432) and process 400 ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer implemented method for performing a set of operations on a data storage device in a Redundant Array of Independent Disk (RAID) array, the computer implemented method comprising:
    flagging, by an adapter, a data storage device as a suspect data storage device, wherein the flagging indicates a rejection due to an error;
    suspending, by the adapter, the suspect data storage device from participation in the RAID array;
    assigning, by the adapter, the suspect data storage device to a pool of data storage devices to be retested;
    selecting, by the adapter, another data storage device from a pool of spare data storage devices, forming a selected data storage device;
    rebuilding, by the adapter, contents of the suspect data storage device on the selected data storage device, forming a substitute data storage device;
    assigning, by the adapter, the substitute data storage device to the RAID array;
    invoking a diagnostic test on the suspect data storage device to produce a diagnostic result, wherein the diagnostic test runs in a background of the RAID array;
    analyzing, by the adapter, the diagnostic result;
    responsive to the diagnostic result not exceeding a threshold, repairing the suspect data storage device to form a repaired data storage device;
    assigning, by the adapter, the repaired data storage device to the pool of spare data storage devices;
    incrementing, by the adapter, a counter associated with the repaired data storage device, wherein the counter indicates a number of times the repaired data storage device has been repaired;
    measuring, by the data storage device, a response interval for an expected communication from the adapter to form a response interval;
    responsive to the response interval exceeding a predetermined threshold, generating a timeout error; and
    wherein the error is the timeout error.

2. The computer implemented method of claim 1, further comprising:
    indicating a status of the repaired data storage device, wherein the status comprises one of, ready with no known problems, ready with fixed problems, and drive not ready.

3. The computer implemented method of claim 1, wherein the data storage device is a hard disk drive.

4. The computer implemented method of claim 1, wherein the data storage device is a solid state device.

5. A computer program product comprising:
    a non-transitory computer usable medium including computer usable program code for performing a set of operations on a data storage device in a Redundant Array of Independent Disk (RAID) array, the computer program product including instructions adapted to cause a computer to perform the following steps:
    flagging, by an adapter, a data storage device as a suspect data storage device, wherein the flagging indicates a rejection due to an error;
    suspending, by the adapter, the suspect data storage device from participation in the RAID array;
    assigning, by the adapter, the suspect data storage device to a pool of data storage devices to be retested;
    selecting, by the adapter, another data storage device from a pool of spare data storage devices, forming a selected data storage device;
    rebuilding, by the adapter, contents of the suspect data storage device on the selected data storage device, forming a substitute data storage device;
    assigning, by the adapter, the substitute data storage device to the RAID array;
    invoking a diagnostic test on the suspect data storage device to produce a diagnostic result, wherein the diagnostic test runs in a background of the RAID array;
    analyzing, by the adapter, the diagnostic result;
    responsive to the diagnostic result not exceeding a threshold, repairing the suspect data storage device to form a repaired data storage device;
    assigning, by the adapter, the repaired data storage device to the pool of spare data storage devices;
    incrementing, by the adapter, a counter associated with the repaired data storage device, wherein the counter indicates a number of times the repaired data storage device has been repaired;
    computer usable program code for measuring, by the data storage device, a response interval for an expected communication from the adapter to form a response interval; and
    computer usable program code for, responsive to the response interval exceeding a predetermined threshold, generating a timeout error; and
    wherein the error is the timeout error.

6. The computer program product of claim 5, further comprising:
    computer usable program code for indicating a status of the repaired data storage device, wherein the status comprises one of, ready with no known problems, ready with fixed problems, and drive not ready.

7. The computer program product of claim 5, wherein the data storage device is a hard disk drive.

8. The computer program product of claim 5, wherein the data storage device is a solid state device.

9. A data processing system for performing a set of operations on a data storage device in a Redundant Array of Independent Disk (RAID) array, comprising:
   a bus system;
   a communications system connected to the bus system;
   a memory connected to the bus system, wherein the memory includes a set of instructions; and
   a processing unit connected to the bus system, wherein the processing unit executes the set of instructions to flag, by an adapter, a data storage device as a suspect data storage device, wherein the flagging indicates a rejection due to an error; suspend, by the adapter, the suspect data storage device from participation in the RAID array; assign, by the adapter, the suspect data storage device to a pool of data storage devices to be retested; select, by the adapter, another data storage device from a pool of spare data storage devices, forming a selected data storage device; rebuild, by the adapter, contents of the suspect data storage device on the selected data storage device, forming a substitute data storage device; assign, by the adapter, the substitute data storage device to the RAID array; invoke a diagnostic test on the suspect data storage device to produce a diagnostic result, wherein the diagnostic test runs in a background of the RAID array; analyze, by the adapter, the diagnostic result; responsive to the diagnostic result not exceeding a threshold, repair the suspect data storage device to form a repaired data storage device; assign, by the adapter, the repaired data storage device to the pool of spare data storage devices; increment, by the adapter, a counter associated with the repaired data storage device, wherein the counter indicates a number of times the repaired data storage device has been repaired; measure, by the data storage device, a response interval for an expected communication from the adapter to form a response interval; responsive to the response interval exceeding a predetermined threshold, generate a timeout error; and wherein the error is the timeout error.

10. The data processing system of claim 9, wherein the processor further executes the instructions to indicate a status of the repaired data storage device, wherein the status comprises one of, ready with no known problems, ready with fixed problems, and drive not ready.

11. The data processing system of claim 9, wherein the data storage device is a hard disk drive.

* * * * *